Figure 1:
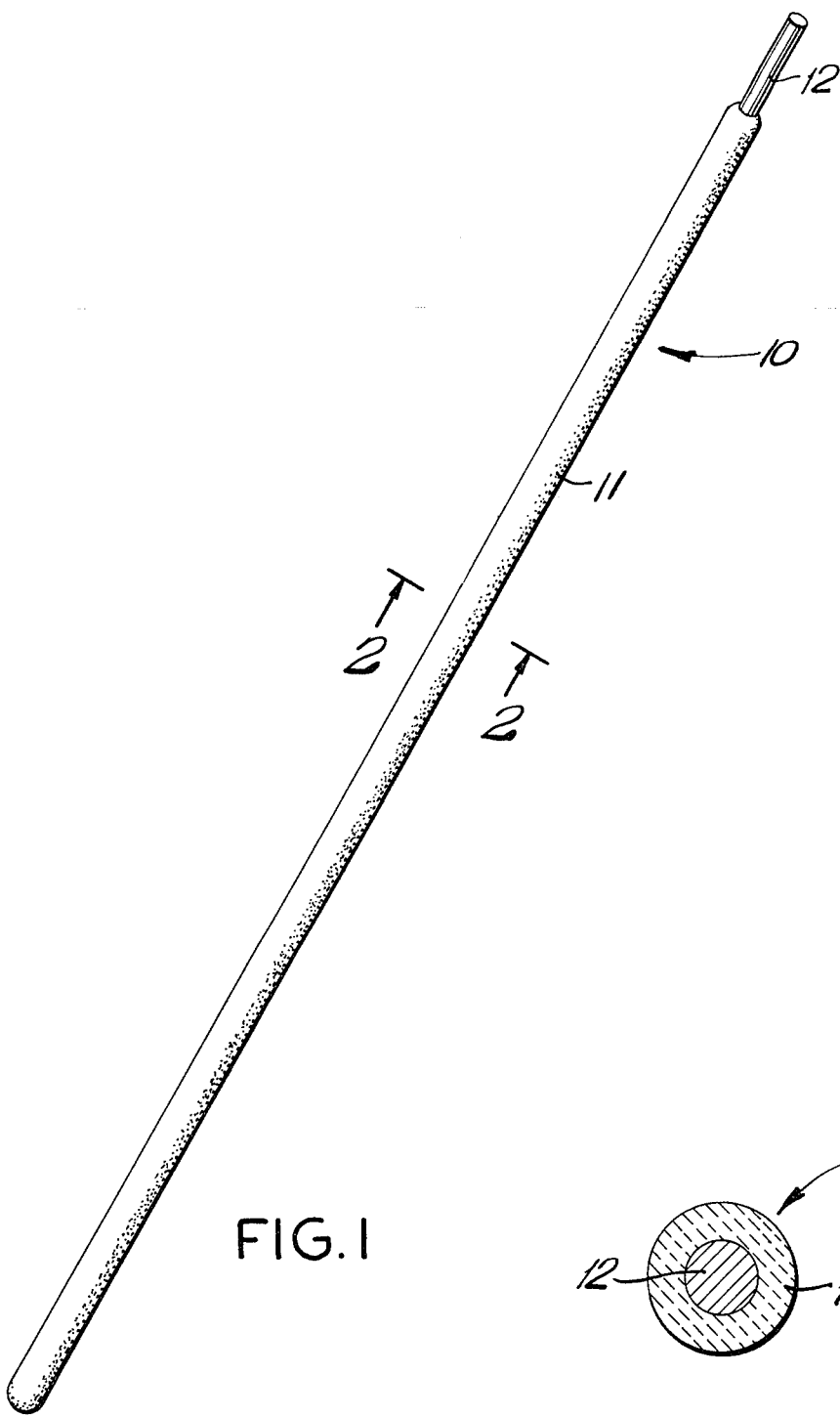

United States Patent [19]

Kammer et al.

[11] 4,426,428
[45] Jan. 17, 1984

[54] NICKEL-BASE WELDING ELECTRODE

[75] Inventors: Paul A. Kammer, Cold Springs Harbor, N.Y.; Edward R. Gamberg, Saverna Park, Md.

[73] Assignee: Eutectic Corporation, Flushing, N.Y.

[21] Appl. No.: 323,479

[22] Filed: Nov. 20, 1981

[51] Int. Cl.$^3$ .......................... B22F 7/04; B23K 35/32
[52] U.S. Cl. ..................................... 428/561; 428/553; 428/558; 428/560; 428/564; 148/23; 148/24; 148/26; 75/257; 219/145.23; 219/146.22; 219/146.23; 219/146.31; 219/146.41; 219/146.32
[58] Field of Search .............. 428/553, 559, 560, 561, 428/563, 564, 557; 148/26, 23, 24; 75/257; 219/146.22, 146.23, 146.31, 146.32, 146.41, 145.23

[56] References Cited

U.S. PATENT DOCUMENTS

| | | | |
|---|---|---|---|
| 1,978,316 | 10/1934 | Miller | 219/10 |
| 2,219,462 | 3/1938 | Wissler | 219/146.41 |
| 2,544,334 | 11/1944 | Linnert | 148/24 |
| 2,632,835 | 1/1952 | Wasserman | 428/563 |
| 4,103,067 | 7/1978 | Jackson et al. | 148/23 |

OTHER PUBLICATIONS

*Welding Handbook*, Section 4, Fifth Edition, Ed. by A. L. Phillips, 1966.

*Primary Examiner*—Brooks H. Hunt
*Assistant Examiner*—Joel P. Okamoto
*Attorney, Agent, or Firm*—Hopgood, Calimafde, Kalil, Blaustein & Judlowe

[57] ABSTRACT

A nickel-base welding electrode is provided comprising a nickel core and a metallic powder-laden flux coating bonded thereto, the total composition of the electrode comprising about 40% to 50% by weight of the nickel core and about 60% to 50% by weight of the coating. The coating contains as fluxes about 18% to 30% titanium dioxide, about 8% to 16% calcium fluoride, about 1% to 3% iron carbonate, about 1.5% to 4% calcium carbonate, about 2% to 6% calcium-magnesium carbonate, and contains as the powdered metals about 20% to 30% chromium, about 3% to 8% manganese, about 1% to 4% molybdenum, about 1% to 5% niobium, about 8% to 18% iron, 0% to about 6% nickel, up to 1% graphite, and as extrusion aids about 1% to 4% clay and about 1% to 5% organic extrusion aid material.

The flux in the coating is mixed with a bonding agent at a ratio of dry flux to bonding agent of about 5:1 to 10:1, the composition of the bonding agent being about 2% to 10% potassium carbonate, about 40% to 70% potassium silicate, about 1% to 6% potassium hydroxide, about 20% to 35% sodium silicate and 0 to about 15% water. The composition relationship of the metal powder in the flux to the nickel core is such as to provide a weld deposit, taking into account metal losses due to oxidation, containing less than about 0.25% C, about 10% to 20% chromium, about 5% to 12% iron, about 0.5% to 2.5% niobium, up to about 1% silicon, about 2% to 5% manganese, up to about 5% molybdenum and the balance essentially nickel.

6 Claims, 2 Drawing Figures

U.S. Patent Jan. 17, 1984 4,426,428

NICKEL-BASE WELDING ELECTRODE

This invention relates to coated consumable welding rods for use in the arc-welding of metal substrates and, in particular, to a welding electrode for providing a weld deposit of a nickel-base alloy containing substantial amounts of chromium and iron and lesser amounts of other alloying ingredients.

STATE OF THE ART

Consumable welding electrodes are known comprising an alloy core rod with generally a flux coating bonding thereto.

Examples of welding rod alloys for use in the arc welding of heat resistant alloys are nickel-base alloys of the type listed on page 284 of the 8th Edition of the ASM Metals Handbook, Vol. 6, entitled Welding and Brazing (1971). Particular reference is made to Table 6 with respect to nickel-base alloys designated as EniCrFe-2, ERNiCr-3, ERNiCrFe-5, ERNiCrFe-6, Inconel 601 and Inconel 625, among others, Inconel being a trademark for nickel-base chromium-iron alloys. In addition to nickel, chromium, and iron, the foregong alloys contain one or more of such alloying ingredients as Mn, Si, Nb and/or Ta, etc. The use of such alloys as weld rods is described on page 283 with regard to the welding of Ni-Cr-Fe alloys to each other, among other alloys.

As illustrative of flux-coated weld rods, reference is made to U.S. Pat. Nos. 2,839,433 and 3,211,582, the latter patent being directed to a hard-facing electrode comprising a chromium alloy steel core covered with a metallic powder-laden flux. The metallic powder in the flux combined with the steel alloy core provides a hard coating when deposited on a metal substrate.

A disadvantage of working with a flux-coated nickel-base chromium-iron core wire is that the alloy is characterized by a low deposition rate. The alloy wire is expensive to produce; and moreover, the usual fluxes combind with it require the use of D.C. or A.C. power, but cannot use both. Deposition rate is important in the field where high production is desired.

It would be desirable to provide a nickel-base welding electrode capable of being deposited at high production rates and which can be used on both A.C. and D.C. power.

OBJECTS OF THE INVENTION

It is an object of the invention to provide an arc-welding electrode capable of forming nickel-base alloy weld deposits at improved production rates.

Another object is to provide an arc-welding electrode characterized by a nickel core rod coated with a metallic powder-laden flux, the metallic powder in the flux being such as to form a nickel-base chromium-iron alloy weld deposit during welding.

Figure 2:
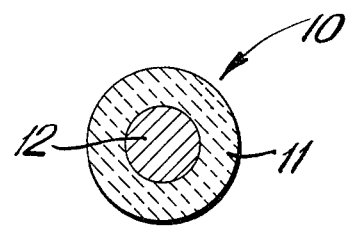

These and other objects will more clearly appear when taken in conjunction with the following disclosure, the appended claims and the accompanying drawing, wherein:

FIG. 1 is a perspective view of one embodiment of the arc-welding electrode; and FIG. 2 is a cross section taken along line 2—2 of FIG. 1.

STATEMENT OF THE INVENTION

As one embodiment, the invention provides a nickel-base welding electrode comprising a nickel core and a metallic powder-laden flux coating bonded thereto, the total composition of the electrode comprising about 40% to 50% by weight of the nickel core and about 60% to 50% by weight of the coating. The coating contains as fluxes about 18% to 30% titanium dioxide, about 8% to 16% calcium fluoride, about 1% to 3% iron carbonate, about 1.5% to 4% calcium carbonate, about 2% to 6% calcium-magnesium carbonate, and also contains as the powdered metals (present as metals, alloys and ferroalloys) about 20% to 30% chromium, about 3% to 8% manganese, about 1% to 4% molybdenum, about 1% to 5% niobium, about 8% to 18% iron, 0% to about 6% nickel, up to about 1% graphite, and as extrusion aids about 1% to 4% clay and about 1% to 5% organic material. The flux in the coating is mixed with a bonding agent at the ratio of dry flux to bonding agent of about 5:1 to 10:1, the composition of the bonding agent being about 2% to 10% potassium carbonate, about 40% to 70% potassium silicate, about 1% to 6% potassium hydroxide, about 20% to 35% sodium silicate and 0 to about 15% water. The composition relationship of the metal powder in the flux to the nickel core is such as to provide a weld deposit, taking into account metal losses, such as those due to oxidation, containing less than about 0.25% C, about 10% to 20% chromium, about 5% to 12% iron, about 0.5% to 2.5% niobium, up to about 1% silicon, about 2% to 5% manganese, 0 to about 5% molybdenum and the balance essentially nickel.

A preferred composition of the electrode is one in which the coating contains as fluxes about 21% to 25% titanium dioxide, about 10% to 14% calcium fluoride, about 1.5% to 2.5% iron carbonate, about 2% to 3.5% calcium carbonate, about 3% to 5% calcium-magnesium carbonate, and contains as the powdered metals about 23% to 27% chromium, about 5% to 7% manganese, about 1¾% to 3½% molybdenum, about 2¾% to 4½% niobium, about 10% to 15% iron, about 0% to 4½% nickel, up to about 0.75% graphite, and as extrusion aids about 1% to 3% clay and about 1% to 4% organic material selected from the group of starches and alginates. The flux in the coating is mixed with a bonding agent at the ratio of dry flux to bonding agent of about 6:1 to 8:1, the composition of the bonding agent being about 4% to 8% potassium carbonate, about 45% to 65% potassium silicate, about 1% to 4% potassium hydroxide, about 22% to 32% sodium silicate and 0 to 12% water, the composition relationship of the metal powder in the flux to the nickel core being such as to provide a weld deposit, taking into account metal losses, such as those due to oxidation, containing less than about 0.15% C, about 14% to 18% chromium, about 8% to 12% iron, about 1% to 2.5% niobium, up to about 0.75 % silicon, about 2% to 4% manganese, up to about 4% molybdenum and the balance essentially nickel.

One embodiment of the weld rod of the invention is shown in FIGS. 1 and 2. Weld rod 10 is shown comprising a core rod 12 of nickel covered with a metallic-laden flux coating 11, the details of the coating being shown in the cross section of FIG. 2.

As illustrative of the invention, the following detailed example is given:

EXAMPLE

A weld rod is produced using a core rod of nickel of about ⅛" diameter having a bonded coating thereon comprising a metallic-laden flux composition, the nickel core rod making up 50% by weight of the weld rod.

The coating had the following ingredients given in percentage by weight of the coating:

|  |  |  |
|---|---|---|
|  | Titanium Dioxide | 23.0 |
|  | Calcium Fluoride | 11.50 |
|  | Iron Carbonate | 1.95 |
|  | Calcium Carbonate | 2.85 |
|  | Calcium-Magnesium Carbonate | 4.0 |
|  | Chromium | 24.7 |
|  | Manganese | 5.75 |
|  | Molybdenum | 2.25 |
|  | Niobium | 3.45 |
|  | Iron | 12.65 |
|  | Nickel | 3.45 |
|  | Graphite | 0.20 |
| Extrusion Aids | Clay | 2.05 |
|  | Others* | 2.20 |

*The other extrusion aids include organics from the group consisting of starches and alginates.

The aforementioned coating also includes binders in an amount of 7 parts by weight of dry flux to 1 part by weight of binder having the following composition:

| Binder |  |
|---|---|
| Potassium Carbonate | 6.00 |
| Potassium Silicate | 55.50 |
| Potassium Hydroxide | 3.00 |
| Sodium Silicate | 27.50 |
| Water | 8.00 |

The dry flux in the formulation amounts to 43.30 parts by weight which calls for about 6.2 parts by weight of binder.

The nickel-base alloy weld deposit, depending upon losses due to oxidation during welding, will contain approximately 15-17% Cr, 2-4% Mn, 12½% Mo, 1.5-2% Nb, 8-9% Fe and the balance nickel.

A typical weld deposit using the foregoing weld rod composition is obtained by electrically contacting the weld rod with the work piece (e.g., a nickel-chromium-iron alloy substrate) and setting up an arc by gently lifting the weld rod to the appropriate arc gap and the weld rod caused to melt by virtue of the heat generated by the arc. For the aforementioned weld rod in which the nickel core has a ⅛ inch diameter, the D.C. voltage employed is about 25 volts and the current about 140 amperes.

In the situation where the core is the same composition as the weld deposit, the deposition rate under the foregoing conditions is generally in the range of about 2 to 2½ lbs./hr. Where the core wire has the same composition as the weld deposit, the welding amperage is lower in order to prevent overheating of the electrode (whereby a portion is unusable and thus results in high stub losses); and therefore, the deposition rate for a ⅛" electrode in which the core wire has the same composition as the weld deposit is in the range of 2¼ to 2½ lbs. per hour (at about 23 volts and 110 amps).

It should also be noted that many other core wires of alloy composition the same (or very similar) as that of the deposit will also exhibit the same overheating tendency and thus be restricted as to the maximum welding current to be used. It is possible, therefore, to use a core wire of a composition essentially that of the major metal component of the desired weld deposit and by alloy with the coating and obtain an electrode which is usable at higher welding currents, thus achieving increased deposition rates (when the major metal component has a lower resistance to the passage of electric current than the alloy itself).

On the other hand, where the weld rod of the invention is used under the proper conditions, the deposit rate is much higher and may range from about 3½ to 3¾ lbs./hr.

The weld rod of the invention, as previously stated, is advantageous in that either A.C. or D.C. power can be used. The weld deposit produced by the weld rod of the invention is characterized by good tensile strength, for example, a nominal tensile strength of about 94,000 psi and excellent ductility as determined by percent elongation, for example, a percent elongation of about 35%.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

We claim:

1. A nickel-base welding electrode consisting essentially of a nickel core and a metallic powder-laden flux coating bonded thereto, the total composition of said electrode comprising about 40% to 50% by weight of said nickel core and about 60% to 50% by weight of said coating, said coating containing as fluxes about 18% to 30% titanium dioxide, about 8% to 16% calcium fluoride, about 1% to 3% iron carbonate, about 1.5% to 4% calcium carbonate, about 2% to 6% calcium-magnesium carbonate, and containing as the powdered metals about 20% to 30% chromium, about 3% to 8% manganese, about 1% to 4% molybdenum, about 1% to 5% niobium, about 8% to 18% iron, 0% to about 6% nickel, up to 1% graphite, and as extrusion aids about 1% to 4% clay and about 1% to 5% organic extrusion aid material, the flux in said coating being mixed with a bonding agent at the ratio of dry flux to bonding agent of about 5:1 to 10:1, the composition of the bonding agent being about 2% to 10% potassium carbonate, about 40% to 70% potassium silicate, about 1% to 6% potassium hydroxide, about 20% to 35% sodium silicate and 0 to about 15% water, the composition relationship of the metal powder in the flux to the nickel core being such as to provide a weld deposit produced by an electro-arc process, taking into account metal losses due to oxidation, containing less than about 0.25% C, about 10% to 20% chromium, about 5% to 12% iron, about 0.5% to 2.5% niobium, up to about 1% silicon, about 2% to 5% manganese, up to about 5% molybdenum and the balance essentially nickel, the deposit rate of said weld deposit using the electro-arc process being substantially greater than the deposit rate for the same weld deposit produced from an electrode having a nickel alloy core of substantially the same composition of the weld deposit instead of a nickel core.

2. A nickel-base welding electrode of claim 1, wherein the metallic powder-laden flux coating comprises:

about 21% to 25% titanium dioxide, about 10% to 14% calcium fluoride, about 1.5% to 2.5% iron carbonate, about 2% to 3.5% calcium carbonate, about 3% to 5% calcium-magnesium carbonate, and containing as the powdered metals about 23% to 27% chromium, about 5% to 7% manganese, about $1\frac{3}{4}$% to $3\frac{1}{2}$% molybdenum, about $2\frac{3}{4}$% to $4\frac{1}{2}$% niobium, about 10% to 15% iron, 0% to about $4\frac{1}{2}$% nickel, up to 0.75% graphite, and as extrusion aids about 1% to 3% clay and about 1% to 4% organic extrusion aid material selected from the group consisting of starches and alginates, the flux in said coating being mixed with a bonding agent at the ratio of dry flux to bonding agent of about 6:1 to 8:1, the composition of the bonding agent being about 4% to 8% potassium carbonate, about 45% to 65% potassium silicate, about 1% to 4% potassium hydroxide, about 22% to 32% sodium silicate and 0 to about 12% water, the composition relationship of the metal powder in the flux to the nickel core being such as to provide a weld deposit, taking into account metal losses due to oxidation, containing less than about 0.15% C., about 14% to 18% chromium, about 8% to 12% iron, about 1% to 2.5% niobium, up to about 0.75% silicon, about 2% to 4% manganese, up to about 4% molybdenum and the balance essentially nickel.

3. A process for arc-welding a work piece which comprises, electrically contacting said work piece with a weld electrode and thus form a welding arc therewith, said weld electrode consisting essentially of a nickel core having a metallic powder-laden flux coating bonded thereto, said flux coating containing as fluxes about 18% to 30% titanium dioxide, about 8% to 16% calcium fluoride, about 1% to 3% iron carbonate, about 1.5% to 4% calcium carbonate, about 2% to 6% calcium-magnesium carbonate, and containing as the powdered metals about 20% to 30% chromium, about 3% to 8% manganese, about 1% to 4% molybdenum, about 1% to 5% niobium, about 8% to 18% iron, 0% to about 6% nickel, up to 1% graphite, and as extrusion aids about 1% to 4% clay and about 1% to 5% organic extrusion aid material, the flux in said coating being mixed with a bonding agent at the ratio of dry flux to bonding agent of about 5:1 to 10:1, the composition relationship of the metal powder in the flux to the nickel core being such as to provide a weld deposit, taking into account metal losses due to oxidation, containing less than about 0.25% C, about 10% to 20% chromium, about 5% to 12% iron, about 0.5% to 2.5% niobium, up to about 1% silicon, about 2% to 5% manganese, up to about 5% molybdenum and the balance essentially nickel, and continuing said arc-welding to provide a weld deposit of the aforementioned composition, the deposit rate of said weld deposit being substantially greater than the rate of deposit obtained for producing the same weld deposit using a nickel alloy core having substantially the same composition as the weld deposit.

4. The arc-welding process of claim 3, wherein the metallic powder-laden flux coating comprises, about 21% to 25% titanium dioxide, about 10% to 14% calcium fluoride, about 1.5% to 2.5% iron carbonate, about 2% to 3.5% calcium carbonate, about 3% to 5% calcium-magnesium carbonate, and containing as the powdered metals about 23% to 27% chromium, about 5% to 7% manganese, about $1\frac{3}{4}$% to $3\frac{1}{2}$% molybdenum, about $2\frac{3}{4}$% to $4\frac{1}{2}$% niobium, about 10% to 15% iron, 0% to about $4\frac{1}{2}$% nickel, up to 0.75% graphite, and as extrusion aids about 1% to 3% clay and about 1% to 4% organic extrusion aid material selected from the group consisting of starches and alginates, the flux in said coating being mixed with a bonding agent at the ratio of dry flux to bonding agent of about 6:1 to 8:1, the composition relationship of the metal powder in the flux to the nickel core being such as to provide a weld deposit, taking into account metal losses due to oxidation, containing less than about 0.15% C, about 14% to 18% chromium, about 8% to 12% iron, about 1% to 2.5% niobium, up to about 0.75% silicon, about 2% to 4% manganese, up to about 4% molybdenum and the balance essentially nickel.

5. The arc-welding process of claim 3, wherein the composition of the bonding agent is about 2% to 10% potassium carbonate, about 40% to 70% potassium silicate, about 1% to 6% potassium hydroxide, about 20% to 35% sodium silicate and 0 to about 15% water.

6. The arc-welding process of claim 4, wherein the composition of the bonding agent is about 4% to 8% potassium carbonate, about 45% to 65% potassium silicate, about 1% to 4% potassium hydroxide, about 22% to 32% sodium silicate and 0 to about 12% water.

* * * * *